(12) United States Patent
Kanata et al.

(10) Patent No.: US 6,473,202 B1
(45) Date of Patent: Oct. 29, 2002

(54) IMAGE PROCESSING APPARATUS

(75) Inventors: Toshihiro Kanata, Nara (JP); Yasushi Adachi, Nara (JP); Makoto Otsu, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/314,327

(22) Filed: May 19, 1999

(30) Foreign Application Priority Data

May 20, 1998 (JP) ........................................... 10-138789

(51) Int. Cl.⁷ .......................... G06K 15/02; G06K 9/36; H04N 1/409; H04N 1/58; H04N 1/40; H04N 1/48
(52) U.S. Cl. ...................... 358/2.1; 358/3.24; 358/3.27; 358/530; 358/532; 382/164; 382/173; 382/176; 382/205
(58) Field of Search ................................. 358/2.1, 2.99, 358/3.24, 3.26, 3.27, 1.9, 529, 530, 532, 518; 382/162, 164, 173, 176, 256, 266, 205

(56) References Cited

U.S. PATENT DOCUMENTS

| | | | | | |
|---|---|---|---|---|---|
| 5,208,663 | A | * | 5/1993 | Hiratsuka et al. | ............ 358/500 |
| 5,477,346 | A | * | 12/1995 | Murata | ........................ 358/529 |
| 5,659,407 | A | * | 8/1997 | Andresen et al. | ............. 358/1.9 |
| 5,850,293 | A | * | 12/1998 | Suzuki et al. | .............. 358/3.27 |

FOREIGN PATENT DOCUMENTS

| | | |
|---|---|---|
| JP | 5-56287 | 3/1993 |
| JP | 5-167842 | 7/1993 |

* cited by examiner

*Primary Examiner*—Scott Rogers
(74) *Attorney, Agent, or Firm*—Dike, Bronstein, Roberts & Cushman/Edwards & Angell; David G. Conlin

(57) ABSTRACT

An image processing apparatus includes: a parameter computing means which computes the maximum density value, the summation of density differences, the average density and the maximum density difference for each pixel in a mask containing a target pixel; and a color determination counting circuit which makes appropriate, selective threshold comparisons based on the computed result from the parameter computing circuit to determine an area in a mask as being chromatic, achromatic or 'the other' area.

4 Claims, 2 Drawing Sheets

IMAGE PROCESSING APPARATUS

BACKGROUND OF THE INVENTION

(1) Field of the Invention

The present invention relates to a color image reproducing apparatus such as color copiers, color facsimile machines and the like, specifically relating to an image segmentation technology for subjecting image areas to effective filtering and other processes.

(2) Description of the Related Art

In general, in a color image reproducing apparatus which performs area determination as to an original made up of characters, continuous dot images, screened halftone images etc., classifying it into character areas, continuous dot areas, screened halftone areas etc., so as to perform optimized processing in accordance with the characteristics of different image areas, a chromatic area is reproduced by a mixture of three color toners, i.e., C(cyan), M(magenta) and Y(yellow) while Bk(black) toner is used to reproduce sharp black character areas.

When the above color image reproducing apparatus is used, it is necessary to correctly determine black characters as belonging to achromatic areas. If a black character, especially, a blurred color portion around black characters, is mistaken as belonging to a chromatic area, the black character is reproduced by a mixture of the three colors of C, M and Y. Further, if these are then subjected to emphasis filtering or the like, the hues are emphasized so that the reproduction cannot be obtained as being black, resulting in failure to reproduce sharp black characters.

In order to reproduce sharp black characters, black characters, inclusive of blurred color portions need to be determined as belonging to achromatic areas without any misjudgment. When black characters are determined as belonging to achromatic areas, the area is usually reproduced with only the black toner, so that emphasis filtering and other processes can produce a beneficial result.

Conventionally, in order to distinguish black characters, Japanese Patent Application Laid-Open Hei 5 No.167,842 (prior art 1) discloses a method in which it was noticed that the greatest density difference and the sum of the density differences characterize black characters on a white background, so that the characteristic values, i.e., the greatest density difference and the sum of the density differences within a predetermined area including a target pixel are computed to determine that the area is a character area.

Japanese Patent Application Laid-Open Hie 5 No.56,287 (prior art 2) discloses a method in which the greatest density difference of each pixel is used to distinguish between chromatic and achromatic colors.

However, in the prior art 1, though judgment about character areas is made, but no color determination as to chromatic and achromatic colors is made. Therefore, the problem described above, that is, misjudgment of achromatic, black characters as chromatic color may incidentally occur.

In the prior art 2, since color judgement between chromatic and achromatic colors is made only based on the greatest density difference of each pixel, misjudgment will occur at a great number of points due to difference in density of the input image. Therefore, it is impossible for the noise removing circuit to completely remove the misjudged portions.

SUMMARY OF THE INVENTION

The present invention has been devised in order to solve the above problems, and it is therefore an object of the present invention to provide an image processing apparatus, which is able to avoid misjudgment as to color determination for area determination and can determine a blurred color portion around black characters as belonging to an achromatic area so as to produce a markedly beneficial output when black character areas are subjected to emphasis filtering and the like.

In order to achieve the above object, the present invention is configured as follows:

In accordance with the first aspect of the invention, an image processing apparatus wherein area determination as to an original having characters, continuous dot images, screened halftone images mixed therein is effected classifying the original into character areas, continuous dot areas, screened halftone areas for each pixel in order to perform optimized processing in accordance with the characteristics of different image areas, includes:

a parameter computing means which computes the maximum density value, the summation of density differences, the average density and the maximum density difference for each pixel in a mask containing a target pixel; and an area determining means which determines an area in a mask, as being chromatic, achromatic or of the others, by comparing the computed results from the parameter computing means with selective thresholds.

In accordance with the second aspect of the invention, an image processing apparatus wherein area determination as to an original having characters, continuous dot images, screened halftone images mixed-therein is effected classifying the original into character areas, continuous dot areas, screened halftone areas for each pixel in order to perform optimized processing in accordance with the characteristics of different image areas, includes:

a parameter computing means which computes the maximum density value, the summation of density differences, the average density and the maximum density difference for each pixel in a mask containing a target pixel;

an area determining means which determines an area in a mask, as being chromatic, achromatic or of the others, by comparing the computed results from the parameter computing means with selective thresholds; and, a color determining means which performs area determination of a target pixel based on the results from the area determining means and based on the number of pixels, having judged to be of achromatic, in the mask containing a target pixel and/or the chromatic color ratio in the mask, both determined from the area determining means.

In accordance with the third aspect of the invention, an image processing apparatus wherein area determination as to an original having characters, continuous dot images, screened halftone images mixed therein is effected classifying the original into character areas, continuous dot areas, screened halftone areas for each pixel in order to perform optimized processing in accordance with the characteristics of different image areas, includes:

a parameter computing means which computes the maximum density value, the summation of density differences, the average density and the maximum density difference for each pixel in a mask containing a target pixel;

an area determining means which determines an area in a mask, as being chromatic, achromatic or of the others, by comparing the computed results from the parameter computing means with selective thresholds;

a deep color determining means for counting the number of deep chromatic pixels in a mask containing a target pixel; and a color determining means which performs area determination of a target pixel based on the results from the area determining means and the determined result from the deep color determining means.

In accordance with the fourth aspect of the invention, the image processing apparatus having the above first feature further includes a color determining unit in which a determined result of chromatic or achromatic color of one or more particular target pixel is used as the representative determined result for all pixels in the mask.

In accordance with the first configuration, the parameter computing means computes the maximum density value, the summation of density differences, the average density and the maximum density difference for each pixel in a mask containing a target pixel, and the area determining means determines an area in a mask, by selectively comparing the computed results from the parameter computing means with thresholds, so as to perform area determination as to being chromatic, achromatic or 'the other' area with a good precision. Therefore, the judgement will not be affected by the density of black characters and hence it is possible to lessen misjudged areas. As a result, optimized processing can be done in accordance with the characteristics of the image areas.

In accordance with the second configuration, the parameter computing means computes the maximum density value, the summation of density differences, the average density and the maximum density difference for each pixel in a mask containing a target pixel, and the area determining means determines an area in a mask, by selectively comparing the computed results from the parameter computing means with thresholds, so as to perform area determination as to being chromatic, achromatic or 'the other' area with a good precision. Further, provision of the color determining means which performs area determination of a target pixel based on the number of pixels, having been judged to be achromatic, in the mask containing the target pixel and/or the chromatic color ratio in the mask, makes it possible to judge blurred color portions around black characters to be of achromatic area.

As a result, blurred color portions around black characters can also be subjected to post-processing such as an emphasis filtering process for black characters.

In accordance with the third configuration, the parameter computing means computes the maximum density value, the summation of density differences, the average density and the maximum density difference for each pixel in a mask containing a target pixel, and the area determining means determines an area in a mask, by selectively comparing the computed results from the parameter computing means with thresholds, so as to perform area determination as to being chromatic, achromatic or 'the other' area with a good precision. Further, provision of the color determining means which performs area determination of a target pixel based on the determined result from the deep color determining means for counting the number of deep chromatic pixels in the mask containing a target pixel and the determined result from the area determining means reduces misjudged areas, thus making it possible to produce a beneficial output.

In accordance with the fourth configuration, a determined result of chromatic or achromatic color of one or more particular target pixel is used as the representative determined result for all pixels in the mask. Thus, this configuration can remove isolated points which could have been misjudged, and hence remove noise components.

DESCRIPTION OF THE PREFERRED EMBODIMENTS

The embodiment of an image processing apparatus in accordance with the invention will hereinafter be described with reference to the accompanying drawings. Here, description is offered using an example of a full-color copier but the embodiment can of course be realized with a color facsimile machine or the like.

Figure 1:
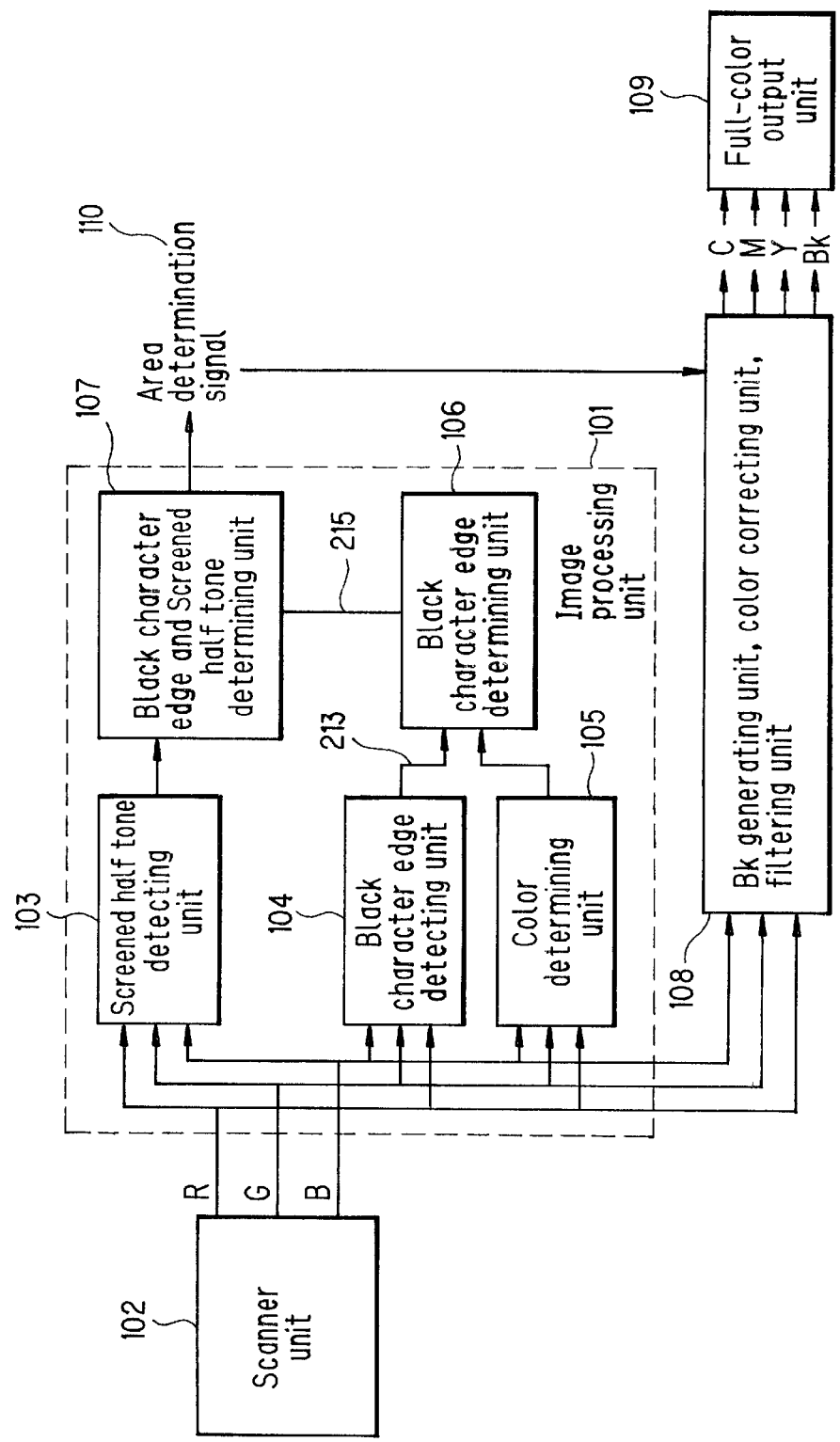
FIG. 1 is a block diagram showing an image processing apparatus in accordance with the embodiment of the invention.

FIG. 1 is a schematic block diagram showing a full-color copier in accordance with the embodiment of the invention.

The full-color copier comprises: a scanner unit 102 which captures the whole image of an original having characters, continuous dot images, screened halftones and others mixed therein; an image processing unit 101 which classifies the image data captured by scanner unit 102 into screened halftone areas, black character edge areas, other areas so as to issue an area determination signal 110; a reproducing unit (comprising of a Bk generating unit, a color correcting unit and a filtering unit) 108 which, based on the area determination signal 110, performs optimized processing of the image data captured by scanner unit 102 in accordance with the characteristics of the areas, and separates the processed data into C, M, Y and Bk signals and outputs them to a full-color output unit 109.

Next, the above image processing unit 101 will be described in detail.

Image processing unit 101 includes the following processing units for processing the image data captured by scanner unit 102, that is, a screened halftone detecting unit 103 for performing screened halftone area detection, a black character edge detecting unit 104 for performing black character edge area detection, a color determining unit 105, a black character edge determining unit 106, and a black character edge and screened halftone determining unit 107 for outputting area determination signal 110 based on the detected results from screened halftone detecting unit 103 and black character edge determining unit 106.

Screened halftone detecting unit 103 uses a generally known screened halftone detecting method, in which detection is performed by generating masks so as to detect local maximal and minimal points and determine peak points; calculating the periodicity of the distance between peak points, the degree of dispersion of peak points and other parameters; setting up thresholds for those parameters to detect the screened halftones based on these thresholds.

Black character edge detecting unit 104 detects character edges from the image data captured by scanner unit 102, using an edge detecting filter: such as Sobel filter.

Color determining unit 105 subjects the image data captured by scanner unit 102 to the predetermined feature extracting process to perform color determination as to chromatic and achromatic colors in the image data. The detail of the color determining means etc., will be described later.

Black character edge determining unit 106 judges whether the image data is of black characters, based on the black character edge determination signal output from black charter edge detecting unit 104 and the color determination signal output from color determining unit 105. The result of determination, i.e., a black character edge determination signal 215 is output to black character edge and screened halftone determining unit 107. The detail of the determining means etc., will be described later.

Black character edge and screened halftone determining unit 107 selects a preferred signal (area determination signal 110) from the area determination signals output from screened halftone detecting unit 103 and black character edge determining unit 106, and outputs the area determination signal 110 as a process selection signal to reproducing unit 108.

Figure 2:
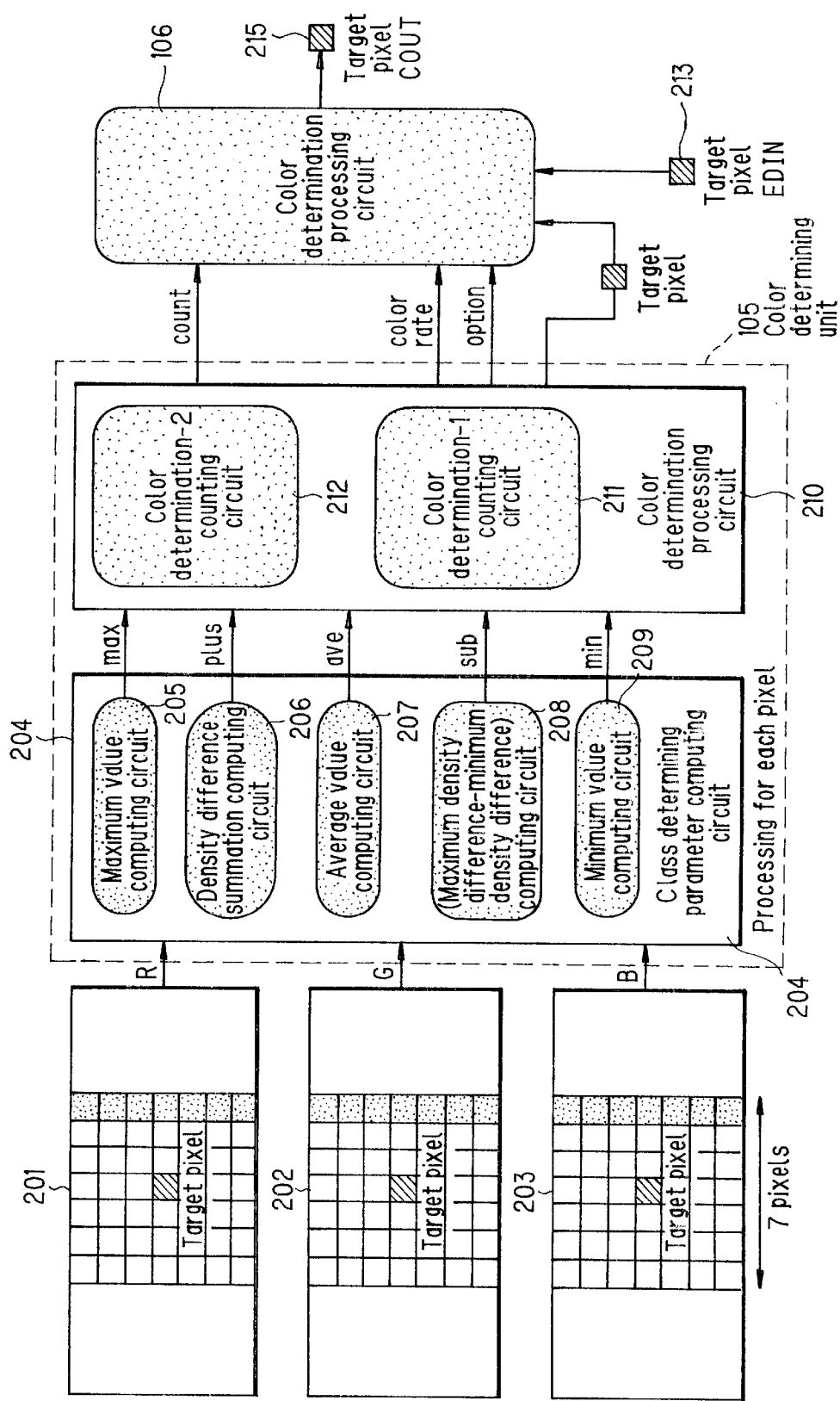
FIG. 2 is a block diagram showing a color determining unit 105 and a black character edge determining unit 106 shown in FIG. 1.

Referring to FIG. 2, color determining unit 105 will be described in detail.

Color determining unit 105 is constructed by class determining parameter computing circuit 204 and color determination counting circuit 210 and performs color determination processing based on a 7×7 pixel masked signal R(red) 201, a 7×7 pixel masked signal G(green) 202 and a 7×7 pixel masked signal B(blue) 203, obtained by storing the image signal output from an unillustrated line memory, in FIFO (first-in first-out) memory.

<Class Determining Parameter Computing Circuit>

Class determining parameter computing circuit 204 determines the maximum density value, the summation of density differences, the average value, the maximum density difference (the greatest density difference—the lowest density difference) and the minimum density value. For this purpose, this circuit comprises: a maximum value computing circuit 205; a density difference summation computing circuit 206; an average value computing circuit 207; a maximum density difference (the greatest density difference—the lowest density difference) computing circuit 208; and a minimum value computing circuit 209. Each circuit is described hereinbelow:

Maximum value computing unit 205 computes the maximum density value (max=max(R,G,B)) of RGB signals for each pixel throughout all 49 pixels.

This calculation is done because of the condition that pixels having low densities should not be judged as being of black characters.

Density difference summation computing circuit 206 computes the summation of the density differences of RGB signals (plus=(|R−G|+|G−B|+|B−R|)) for each pixel throughout all 49 pixels.

This calculation is done because the condition that pixels having large density variations should not be judged as being of achromatic color.

Average value computing circuit 207 computes the average value (ave=ave(R,G,B)) of the densities of RGB signals in each pixel throughout all 49 pixels.

This calculation is done because of the conditions that achromatic color and color blurring have a density greater than a certain level and that color shift density variation to be determined as achromatic areas varies due to the average density of the pixels.

Maximum density difference computing circuit 208 computes the maximum density difference (sub=max (|R−G|, |G−B|, |B−R|)−min(|R−G|, |G−B|, |B−R|) of RGB signals in each pixel throughout all 49 pixels.

This calculation is done because of the condition that a pixel with only one color of R, G or B different in density from the others is not judged to be of achromatic area. This is also used for a deep color determining process whereby a pixel having a high density with only one color extremely different in density from the others is not determined to be of achromatic area.

Minimum value computing circuit 209 computes the minimum density value (min=min(R,G,B)) of RGB signals in each pixel throughout all 49 pixels.

This is used as the parameter for prevention of color blurring in deep colors.

Thus, based on the each signals (the maximum density value 'max', density difference summation 'plus', average density value 'ave', maximum density difference 'sub' and minimum density value 'min'), color determination counting circuit 210 performs color determination as follows:

<Color Determination Counting Circuit>

Color determination counting circuit 210 performs processing based on the signals obtained from class determining parameter computing circuit 204 and is composed of a color determination-1 counting circuit 211 and a color determination-2 counting circuit 212.

Color determination-1 counting circuit 211 is a processing circuit which classifies target pixel into achromatic, chromatic or the other classes. That is, this circuit classifies 49 pixels including a target pixel into class1=1(achromatic color), class1=2(chromatic color) and class1=3 (the others) by the following processing steps (a1) to (a3). In the following expressions, TH, THmax, THplus, THave1, THave1 to THave5, THsub1 to THsub5 are thresholds for corresponding parameters, and can be changed as appropriate and are stored in the register as constant values.

(a1) As the initial setup, classification 'class1' for each pixel is initialized to class1=2 (chromatic color).

(a2) When each pixel satisfies the following conditions, classification 'class1' for the pixel is set to 1 (achromatic color).

(max≦THmax) & (plus<THplus) & (ave≧THave2) & (sub<THsub1) or (max≦THmax) & (plus<THplus) & (THave2>ave≧THave3) & (sub<THsub2) or (max≦THmax) & (plus<THplus) & (THave3>ave≧THave4) & (sub<THsub3) or (max≦THmax) & (plus<THplus) & (THave4>ave≧THave5) & (sub<THsub4) or (max≦THmax) & (plus<THplus) & (ave<THave5) & (sub<THsub5)

(a3) When a pixel satisfies the following conditions, classification 'class1' of the pixel is set to 3 (the others):

(ave>THave1).

This condition is to judge as the original background an area of which the average density value ave is lower than THave1, and classify it as 'the other area'.

However, even with the above condition satisfied, if the condition:

(R≦TH) or (G≦TH) or (B≦TH) is satisfied, class1 is set to 2 (chromatic).

This condition is necessary because an area having a density which is judged as the original background should be determined to be of chromatic color if the area contains a certain color having a density greater than a fixed threshold TH.

For 49 pixels including a target pixel, the following process is performed in order to determine the number of achromatic pixels 'option' and the ratio 'colorrate' (chromatic color ratio) which is the ratio of the number of chromatic pixels to the number of achromatic pixels 'option' in the mask.

(b1) When class1=2 (chromatic color), then sumcolor= sumcolor+1

(b2) When class1=1 (achromatic color) then sumblack= subblack+1 option=option+1.

When (sumblack+sumcolor)≠0 then colorrate=sumcolor/(sumblack+sumcolor).

When (sumblack+sumcolor)=0 then colorrate=0.

When colorrate≧THCOL, then signal=1.

Here, THCOL is the threshold for the parameter 'colorrate'(chromatic color ratio) and is stored as a constant value in a register.

Color determination-2 counting circuit 212 is a processing circuit which classifies target pixels into deep chromatic color and 'the other' classes. That is, this circuit classifies 49 pixels including a target pixel into class2=1(deep chromatic color) and class2=2(the others) by the following processing steps (c1), (c2).

(c1) As the initial setup, deep color classification 'class2' for each pixel is initialized to class2=2 (the others).

(c2) When each pixel satisfies the following conditions, deep color classification 'class2' is set to 1 (deep chromatic color).

(min≦THMIN) and (sub≧THsub6).

For 49 pixels including a target pixel, the following process is performed in order to determine the number of deep chromatic pixels ('count').

When class2=1(deep chromatic color), then count=count+1

Here, THMIN, THsub are the thresholds for the parameters 'min' and 'sub' and are stored as constant values in a register.

<Black Character Edge Determining Unit 106>

As shown in FIG. 2, black character edge determining unit 106 performs black character edge detection using an edge signal 213 output from black character edge detecting unit 104 and the signal output from color determination counting circuit 210 to output a black character edge determination signal 215 to black character edge and screened halftone determining unit 107. The determining process of black character edge determining unit 106 will be described hereinbelow.

The edge signal (labeled by EDIN) sent from black character edge detecting unit 104 is assumed to be categorized into three classes: edge signal1 (EDIN=1) for high density areas; edge signal2 (EDIN=2) for low density areas; and the others (EDIN=3).

(d1) When a target pixel satisfies the following conditions, black character edge determining unit 106 determines the pixel as a black chachracter-1 area signal, and outputs it as black character edge determination signal 215:

(EDIN=1) and (class1=1).

(d2) When a target pixel satisfies the following conditions, black character edge determining unit 106 determines the pixel as a black character-2 area signal (signal representing blurred color portion) and outputs it as black character edge determination signal 215:

(EDIN=2) and (class1=1).

(d3) When a target pixel satisfies the following conditions, black character edge determining unit 106 determines the pixel as a black chachracter-2 area signal (signal representing blurred color portion) and outputs it as black character edge determination signal 215:

(EDIN=1or 2) and (class1=2) and (option≧THoption),
where the parameter 'option' is the number of achromatic pixels output from color determination counting circuit 210.

This condition reflects the fact that even if an area was determined to be a chromatic area (class1=2), if the number of achromatic pixels is greater than the predetermined number, the area has a high possibility of being a blurred color portion around black characters.

In this way, the blurred portions around black characters, resulting from the reading imprecision of scanner unit 102 and for other reasons can be judged as black character areas instead of chromatic areas, hence it is possible to subject the areas to emphasis processing so as to reproduce sharp black characters.

(d4) Even when an area does not satisfy the above conditions (d1) to (d3) and hence would be judged as a chromatic area, if the number of deep chromatic pixels (parameter 'count') output from color determination counting circuit 210 satisfies the relation:

(count≧THcount),

'the other area' signal, instead of 'chromatic area' signal, is output as black character edge determination signal 215.

This is to take into consideration the errors during scanner reading. That is, when the number of deep chromatic pixels ('count') is greater than the predetermined number, the area has a high possibility of being a black character edge. Therefore, the area will not be judged as a chromatic area, 'the other area' signal is output as black character edge determination signal 215, thus making it possible to reduce misjudgment of area classification.

(d5) Even when an area does not satisfy the above conditions (d1) to (d4) and hence would be judged as a chromatic area, if the chromatic color ratio (parameter 'colorrate') output from color determination counting circuit 210 satisfies the relation:

(colorrate≧THcr),

'the other area' signal, instead of 'chromatic area' signal, is output as black character edge determination signal 215.

This is necessary because of the fact that when the ratio 'colorrate' (chromatic color ratio) of chromatic color in the mask is greater than the predetermined value, the area is a blurred color burring portion around a black character.

In this way, a blurred portion around black characters is determined as a black character area instead of a chromatic area, so that it is possible to perform correct emphasis to reproduce sharp black characters.

Here, THoption, TH count and THcr are thresholds for corresponding parameters and are stored in a register as constant values.

In the present embodiment, each target pixel in the mask is checked one by one to generate the respective black character edge determination signal. However, the area determination signal of one pixel in the mask may be used as the representative one for all the. 49 pixels in the mask. This configuration can remove isolated points which could have been misjudged, thus removing noise components.

A preferred example of the invention has been described in the above embodiment, the invention should not be limited to this. For example, the arithmetic expressions are not limited, and it is preferred that the determining conditions such as threshold inclusion or threshold exclusion should be appropriately selected in accordance with the properties of the image signal.

In black character edge determining unit 106, the number of achromatic pixels ('option'), the chromatic color ratio ('colorrate') and the number of deep chromatic pixels ('count') are used as the parameters for color determination, but they can be used selectively.

As has been explained, in accordance with the first configuration, the parameter computing means computes the maximum density value, the summation of density differences, the average density and the maximum density difference for each pixel in a mask containing a target pixel, and the area determining means determines an areas in a mask, by selectively comparing the computed results from the parameter computing means with appropriate thresholds, so as to perform area determination as to being chromatic, achromatic and 'the other' area with a good precision. Therefore, the judgement will not be affected by the density of black characters and hence it is possible to lessen misjudged areas. As a result, optimized processing can be done appropriately in accordance with the characteristics of the image areas.

In accordance with the second configuration, the parameter computing means computes the maximum density value, the summation of density differences, the average density and the maximum density difference for each pixel in a mask containing a target pixel, and the area determining means determines an area in a mask, by selectively comparing the computed results from the parameter computing means with appropriate thresholds, so as to perform area determination as to being chromatic, achromatic or 'the other' area with a good precision. Further, provision of the color determining means which performs area determination of a target pixel based on the number of pixels, having been judged to be achromatic, in the mask containing the target pixel and/or the chromatic color ratio in the mask, makes it possible to judge blurred color portions around black characters to be of achromatic area.

As a result, blurred color portions around black characters can also be subjected to post-processing such as an emphasis filtering process for black characters, making it possible to produce a beneficial output.

In accordance with the third configuration, the parameter computing means computes the maximum density value, the summation of density differences, the average density and the maximum density difference for each pixel in a mask containing a target pixel, and the area determining means determines an area in a mask, by selectively comparing the computed results from the parameter computing means with appropriate thresholds, so as to perform area determination as to being chromatic, achromatic or 'the other' area with a good precision. Further, provision of the color determining means which performs area determination of a target pixel based on the determined result from the deep color determining means for counting the number of deep chromatic pixels in the mask containing a target pixel and the determined result from the area determining means reduces misjudged areas, making it possible to produce a beneficial output.

In accordance with the fourth configuration, a determined result of chromatic or achromatic color of one or more particular target pixel is used as the representative determined result for all pixels in the mask. Thus, this configuration can remove isolated points which could have been misjudged, and hence remove noise components.

What is claimed is:

1. An image processing apparatus in which area determination as to an original having characters, continuous dot images, screened halftone images mixed therein is effected classifying the original into character areas, continuous dot areas, screened halftone areas for each pixel in order to perform optimized processing in accordance with the characteristics of different image areas, comprising:

a parameter computing means which computes the maximum density value, the summation of density differences, the average density and the maximum density difference for each pixel in a mask containing a target pixel; and an area determining means which determines an area in a mask, as being chromatic, achromatic or of the others, by comparing the computed results from the parameter computing means with selective thresholds.

2. An image processing apparatus wherein area determination as to an original having characters, continuous dot images, screened halftone images mixed therein is effected classifying the original into character areas, continuous dot areas, screened halftone areas for each pixel in order to perform optimized processing in accordance with the characteristics of different image areas, comprising:

a parameter computing means which computes the maximum density value, the summation of density differences, the average density and the maximum density difference for each pixel in a mask containing a target pixel;

an area determining means which determines an area in a mask, as being chromatic, achromatic or of the others, by comparing the computed results from the parameter computing means with selective thresholds; and, a color determining means which performs area determination of a target pixel based on the determined results from the area determining means and based on the number of pixels, having judged to be of achromatic, in the mask containing a target pixel and/or the chromatic color ratio in the mask, both determined from the area determining means.

3. An image processing apparatus wherein area determination as to an original having characters, continuous dot images, screened halftone images mixed therein is effected classifying the original into character areas, continuous dot areas, screened halftone areas for each pixel in order to perform optimized processing in accordance with the characteristics of different image areas, comprising:

a parameter computing means which computes the maximum density value, the summation of density differences, the average density and the maximum density difference for each pixel in a mask containing a target pixel;

an area determining means which determines an area in a mask, as being chromatic, achromatic or of the others, by comparing the computed results from the parameter computing means with selective thresholds;

a deep color determining means for counting the number of deep chromatic pixels in a mask containing a target pixel; and a color determining means which performs area determination of a target pixel based on the determined results from the area determining means and the determined result from the deep color determining means.

4. The image processing apparatus according to claim 1, further comprising a color determining unit in which a determined result of chromatic or achromatic color of one or more particular target pixel is used as the representative determined result for all pixels in the mask.

* * * * *